(12) United States Patent
Cui (10) Patent No.: US 6,869,980 B2
(45) Date of Patent: Mar. 22, 2005

(54) POLYMER BLEND MEMBRANES FOR USE IN FUEL CELLS

(75) Inventor: Wei Cui, Blaustein (DE)

(73) Assignee: Celanese Ventures GmbH (DE)

(*) Notice: Subject to any disclaimer, the term of this patent is extended or adjusted under 35 U.S.C. 154(b) by 163 days.

(21) Appl. No.: 10/220,899

(22) PCT Filed: Mar. 1, 2001

(86) PCT No.: PCT/EP01/02311
§ 371 (c)(1), (2), (4) Date: Jan. 3, 2003

(87) PCT Pub. No.: WO01/64322
PCT Pub. Date: Sep. 7, 2001

(65) Prior Publication Data
US 2003/0187081 A1  Oct. 2, 2003

(30) Foreign Application Priority Data
Mar. 2, 2000 (DE) .......................................... 100 10 001

(51) Int. Cl.[7] .............................................. B01D 39/00
(52) U.S. Cl. ............... 521/27; 210/500.27; 210/500.41; 521/28; 521/134; 525/390; 525/418; 525/471; 525/480
(58) Field of Search ............................. 521/27, 28, 134; 210/500.27, 500.41; 525/390, 418, 471, 480

(56) References Cited

U.S. PATENT DOCUMENTS

| | | | | |
|---|---|---|---|---|
| 5,082,565 A | * | 1/1992 | Haubs et al. | ............... 210/650 |
| 6,194,474 B1 | * | 2/2001 | Kerres et al. | ................. 521/27 |
| 6,300,381 B1 | * | 10/2001 | Kerres et al. | ................. 521/27 |
| 6,509,441 B1 | * | 1/2003 | Kerres | ......................... 528/391 |

* cited by examiner

Primary Examiner—Morton Foelak
(74) Attorney, Agent, or Firm—Robert H. Hammer, III (57) ABSTRACT

The present invention relates to novel polymer blend membranes comprising a functional polymer based on sulfonated aryl polymers, a reinforcing polymer based on aminated or nitrated polyether sulfones and/or polyether ether sulfone and a plasticizer, and also their use as polymer electrolyte membrane in fuel cells, in particular in low-temperature fuel cells.

20 Claims, 2 Drawing Sheets

Fig. 1    Hydrogen and oxygen permeability as a function of temperature (TE-5)

Fig. 2  Conductivity as a function of temperature

Fig. 3 Structure of the double layer which comprises the upper side comprising SPEK, NH$_2$-PEK and PVDF, and the underside comprising SPEK, NO$_2$-PEK and PVDF.

POLYMER BLEND MEMBRANES FOR USE IN FUEL CELLS

The present invention relates to novel polymer blend membranes based on sulfonated aromatic aryl polymers and their use as polymer electrolyte membrane in fuel cells, in particular in low-temperature fuel cells.

Fuel cell technology has a great potential for use in the fields of space flight, road vehicles, submarines and stationary energy supply. In particular, motor vehicles driven by means of fuel cells provide the hope of improved environmental protection in the traffic sector. However, apart from a few technical problems, the particular problem is that of "cost/benefit ratio". A drastic reduction in the cost of fuel cells is absolutely necessary. The development of inexpensive elements giving the required performance is therefore of great interest for fuel cells.

A polymer electrolyte membrane fuel cell usually comprises cell units comprising terminal leads, gas distributor, electrodes and polymer electrolyte membrane. The electrodes usually comprise platinum as catalyst. Such fuel cells operate using gaseous hydrogen or methanol (DMFC=direct methanol fuel cell).

For use in fuel cells, membranes not only have to have sufficient chemical and mechanical stability and a high proton conductivity but also have to be inexpensive to produce. For this reason, inexpensive starting materials having excellent properties for functionalization and inexpensive processes for membrane production are decisive factors.

The perfluorinated cation exchange membranes used hitherto display serious deficiencies in this respect. Apart from the complex production process and the recycling problem, this material is very expensive and has a high methanol permeability which greatly limits the use of these membranes in methanol fuel cells.

Further membrane materials are modified high-temperature-resistant polymers such as polybenzimidazole (PBI) and polyether sulfone (PES). PBI is usually treated with phosphoric acid for this purpose [Wainright, J. S.; Wang, J.-T.; Savinell, R. F.; Litt, M.; Moaddel, H.; Rogers, C.: Acid Doped Polybenzimidazoles, A New Polymer Electrolyte; The Electrochemical Society, Spring Meeting, San Francisco, May 22–27, Extended Abstracts, Vol.94-1, 982–983 (1994)]. The phosphoric acid molecules are firstly attached to the polymer by means of hydrogen bonds and secondly are bound by protonation of the imidazole groups in the membrane. A problem is, however, that the phosphoric acid is gradually removed from the PBI matrix together with the water which is formed during operation of the fuel cell. Furthermore, the PBI-phosphoric acid membrane has a very low elastic modulus, which is why unsatisfactory membrane stability in fuel cells is to be expected.

EP-A-0574791 and the literature [Nolte, R.; Ledjeff, K.; Bauer, M. and Mülhaupt, R.: Partially Sulfoned poly(arylene ether sulfone)-A Versatile Proton Conducting Membrane Material for Modern Energy Conversion Technologies; Journal of Membrane Science 83, 211–220 (1993)] disclose inexpensive alternative materials based on sulfonated aryl polymers, for example sulfonated PEEK, PEK and PES. However, cation exchange membranes made of such sulfonated aryl polymers display a severe swelling tendency at elevated temperature. This greatly restricts the suitability of such membranes for use in a fuel cell system.

DE-A-4422158, DE-A-198 13 613, DE-A-198 17 376 and DE-A-198 17 374 disclose polymer blend membranes based on sulfonated aryl polymers which have improved mechanical stability.

An important prerequisite for such blends is the compatibility of the materials selected. For this purpose, only materials whose chemical structure is similar should be mixed and then only when specific interactions between polymers having complementary groups occur, e.g. the formation of polysalt from polyacid and polybase, hydrogen bond formation, etc.

The important advantage of the development of polymer blend membranes is that the membrane structure or the membrane properties can be optimized in a targeted manner by varying the blend components and the mixing ratio.

Thus, DE-A-4422158 describes polymer blend membranes comprising sulfonated polyether ketone (PEK) and unmodified polyether sulfone (PES). The two components are completely miscible with one another, which is attributable to their very similar chemical structures and the polarity of PES (ion-dipole interaction). However, this interaction resulting from the structural similarity appears to be still insufficient, so that there is a risk that these membranes will be subject to very severe swelling at elevated temperature at an ion exchange capacity required for operation in fuel cells.

DE-A-4422158 describes three- or four-component blends comprising sulfonated PEK, PES, polyvinylpyrrolidone (PVP) and polyglycol dimethyl ether (PG) which display an improved water uptake, but no quantitative data are reported.

DE-A-198 17 374 discloses blends of sulfonated aryl polymer (PEEK and PSU) and polybenzimidazole PBI which have covalent crosslinking by means of proton transfer from the sulfonated aryl polymer to PBI (e.g. PEEK-$SO_2$—O—H—N-PBI). This crosslinking takes place even at room temperature in a solvent, for example N-methylpyrrolidone (NMP), as a result of which an insoluble polyelectrolyte complex is formed. To produce the polymer blend membrane, the sulfonated aryl polymer has to be converted into a soluble salt form. This additional step makes the production of the membrane complicated.

The interaction between PBI and aryl polymer is so strong that a high inhomogeneity is produced in the membrane between the crosslinking region, the gel phase swollen by water and polymer matrix. This can result in internal stress in the membrane which can lead to a deterioration in the mechanical stability of the membrane.

The prior art discloses polymer blend membranes comprising sulfonated aryl polymer PEEK or PSU together with animated polysulfone (PSU). On this subject, Cui, W in Entwicklung und Charakterisierung von Kationenaustauscher-Membranen aus Arylpolymeren (VDI publishers; ISBN 3-18-359603-2) states that aminated polysulfones are weak polybases and a polyacid/base mixture can consequently be produced in the solution. Both an ionic interaction and hydrogen bonds, i.e. the ring structures which have physical crosslinking, exist between the blend components. This polymer blend membrane was tested in PEMFC and DMFC, giving a current density of 1.0–1.2 $A/cm^2$ at a voltage of 0.7V in $H_2/O_2$-PEMFC and of from 0.4 to 0.6 $A/cm^2$ in air/$H_2$-PEMFC. In DMFC, this membrane also displayed a U-I curve comparable to that of, for example, Nafion-117.

In view of this background, the development of polymer blend membranes crosslinked by means of an ionic interaction for use in fuel cells has good prospects for low-temperature fuel cells.

It is an object of the present invention to provide an inexpensive polymer blend from which it is possible to produce polymer electrolyte membranes for fuel cells which have a performance which is at least the same as or better than the prior art.

The polymer blend to be discovered should make it possible to match the property profile of these membranes to the operating conditions in fuel cells in a targeted manner by variation of the mixing ratio.

The above object is achieved by novel polymer blend membranes which are crosslinked by means of an ionic interaction and are based on modified polyether sulfone and polyether ether sulfone, e.g. aminated polyether sulfone as reinforcing component and sulfonated aryl polymer as functional polymer, and also a plasticizer.

The present invention provides a polymer blend membrane comprising

A) at least one functional polymer based on one or more aryl polymers bearing sulfonic acid groups,
B) at least one reinforcing polymer which is based on one or more aminated polyether sulfones/polyether ether sulfones or nitrated polyether sulfones/polyether ether sulfones and, as a result of its interaction with the functional polymer, improves the stability of the membrane in respect of the swelling behavior and
C) at least one plasticizer which reduces the brittleness of the above-mentioned polymers.

The functional polymer used according to the invention is a sulfonated aryl polymer, for example sulfonated PEEK (SPEEK), sulfonated PEK (SPEK), sulfonated PEEKK (SPEEKK), sulfonated PES (SPES) or sulfonated PEES (SPEES).

According to the invention, the polymer blend membrane can be produced from PBI and modified polyether sulfone or modified polyether ether sulfone. This polymer blend membrane is, like the PBI membrane, functionalized by means of phosphoric acid.

Such aryl polymers comprise aromatic building blocks selected from the group consisting of and thermally stable linking units selected from the group consisting of The sulfonation of aryl polymers is known. Thus, EP 0574791 describes the preparation of sulfonated PEEK. EP-A-008895, EP-A-041780 and EP 0576807 disclose the preparation of sulfonated PEK. The preparation of sulfonated PEEKK is known from E. Müller in "Vernetzte PEEKK-Sulfonamide zur Trennung von Aliphaten/Aromaten-Gemischen" [Research work for a degree, 1995, Hoechst AG, Frankfurt/Main]. EP-A-0008894 and EP-A-0112724 describe the preparation of polyether sulfone.

The degree of sulfonation is preferably from 0.1 to 100%.

The functional polymer used according to the invention is employed in amounts of from 30 to 99.9% by weight, based on the total polymer.

The reinforcing polymer used according to the invention is an aminated polyether sulfone or polyether ether sulfone comprising the structural units where x are each, independently of one another, 0, 1, 2, 3 or 4, or a nitrated polyether sulfone or polyether ether sulfone comprising the structural units where x are each, independently of one another, 0, 1, 2, 3 or 4.

Particular preference is given to aminated polyether sulfones and polyether ether sulfones comprising structural units of the types Particular preference is given to nitrated polyether sulfones and polyether ether sulfones comprising structural units of the types The reinforcing polymer used according to the invention is employed in amounts of from 0.1 to 70% by weight, preferably from 10 to 50% by weight, based on the total polymer.

The ionic interaction between the blend components (polyacid/polybase blends or polyacid/polyacid blends) can be depicted as follows:

$PES-NH_2$+aryl polymer-$SO_3H \rightarrow PES$-$(NH_3)^{+-}SO_3$-aryl polymer
$PES-NO_2$+aryl polymer-$SO_3H \rightarrow PES$-$(NO_2-H)^{+-}SO_3$-aryl polymer
e.g.:
$PES-NH_2$+$PES$-$SO_3H \rightarrow PES$-$(NH_3)^{+-}SO_3$-$PES$
$PES-NO_2$+$PES$-$SO_3H \rightarrow PES$-$(NO_2-H)^{+-}SO_3$-$PES$ The sulfonated polyether sulfone ($PES$-$SO_3H$) and the nitrated PES ($PES$-$NO_2$) are both polyacids and therefore completely miscible with one another. The compatibility of $PES$-$SO_3H$ with aminated PES ($PES$-$NH_2$) is not of concern because of the complete miscibility of the polyacid/polybase mixture. Here, $PES$-$NH_2$ and $PES$-$NO_2$ serve as "macromolecular counterions" for reinforcing the membrane. Although the ionic compound is dissolved in water at elevated temperature, the interaction remains because of the localization of the "macromolecular counterions" at the positions. For this reason, the membrane is firstly reinforced at elevated temperature by means of these "macromolecular counterions" and, secondly, ion transport is promoted by this dissolution. The membrane of the invention thus has the favorable properties at elevated temperature which are required for use in fuel cells.

Polyether sulfones (PES) are commercially available and have a high thermal and chemical stability and good mechanical stability. The polarity of the polymer promotes water uptake.

Methods of preparing nitrated and aminated polyether sulfone and nitrated and aminated polyether ether sulfone are described in the German patent application no. 10010002.3 which has been filed at the same time.

For the purposes of the invention, plasticizers are substances which reduce the brittleness of the membrane produced from the polymer blend. The suitable plasticizers have to be inert under the conditions prevailing in a fuel cell. Furthermore, the plasticizers have to be miscible and compatible with the functional and reinforcing polymers and be soluble in the same dipolar solvent, for example dimethylformamide (DMF), dimethyl sulfoxide (DMSO), N-methylpyrrolidone (NMP) or N,N-dimethylacetamide (DMAC).

Particular preference is given to using a linear polyvinylidene fluoride (PVDF) as plasticizer. The components of the three-component polymer blend membrane comprising functional polymer, reinforcing component and plasticizer are miscible with one another due to hydrogen bonding, acid-based interaction and ion-dipole interaction. Physical crosslinking in the membrane likewise contributes. However, the ion-dipole interaction between PVDF and modified aryl polymers is very weak. If the proportion of PVDF in the blend is increased, phase separation occurs in the membrane. This makes the membrane optically turbid.

The plasticizer content is up to 5% by weight, preferably from 0.001 to 3% by weight, in particular from 0.1 to 2% by weight, based on the total polymer.

PVDF is commercially available and has excellent chemical and thermal stability. The chemical structure of PVDF is as follows The production of the three-component polymer blend membrane of the invention is likewise carried out by the process described below.

The production of the polymer blend membranes of the invention is carried out as follows: A solution of a homogeneous polymer mixture comprising the sulfonated aryl polymer, the aminated PES or the nitrated PES and plasticizers is poured onto a support and is subsequently spread by means of a doctor blade to produce a film of uniform thickness. The solvent in the film is removed, for example, by evaporation. Suitable solvents are, in particular, dimethylformamide (DMF), dimethyl sulfoxide (DMSO), N-methylpyrrolidone (NMP) or N,N-dimethylacetamide (DMAC). The dry film is subsequently detached from the support and the membrane produced is conditioned.

The present invention provides an economically advantageous polymer blend material; the starting polymer is inexpensive and the method of modifying PES and PEES and the production of the polymer blend membrane are simple.

The membrane structure and the membrane properties such as conductivity and membrane swelling can be adjusted according to the application in which the membrane is to be used. Compared to membranes made of sulfonated aryl polymer, the polymer blend membranes of the invention display improved mechanical and thermal properties.

The polymer blend membrane of the invention can consist of one layer or of a plurality of identical or different layers (multilayer), e.g. of a double layer of a) sulfonated aryl polymer and aminated polysulfone and b) sulfonated aryl polymer and nitrated polysulfone. Furthermore, various multilayer membranes comprising at least two different layers selected from the group consisting of SPEK and $NH_2$-PES, SPEK and $NO_2$-PES, SPEK and $NH_2$-PES and plasticizers, SPEK and NO$_2$-PES and plasticizers are also encompassed by the present invention.

The present invention is illustrated by the following examples which do not restrict the scope of the invention:

General method of characterizing the membrane ion exchange capacity (IEC, meq/g): potentiometric titration was used to determine the ion exchange capacity of the membrane.

Swelling (swe, % by weight): The swelling of the membrane is dependent on the medium, the temperature and the time. The membrane specimen was conditioned in water at a particular temperature for a particular time. The water content of the specimen was then determined.

Conductivity (cond, mS/cm): The conductivity of the membrane was measured in water in a measurement cell at temperatures of from 20° C. to 90° C. by means of impedance spectroscopy (Zahnler).

Mechanical properties (elastic modulus N/mm$^2$; elongation at break, %): To determine the mechanical properties of the membrane, the specimen was pretreated for 4 hours at 23° C. and 50% humidity in a thermostatted and humidity-controlled cabinet or the sample was conditioned for 30 minutes in water at 23° C. and at 80° C. The specimen was then tested on a tensile tester (Zwick; pretension:0.5 N; strain rate: 50 mm/min).

Thermal properties: The glass transition temperature and decomposition temperature of the membrane were determined by means of DSC and TGA (Mettler Toledo; 10 k/min).

Permeability: Hydrogen, oxygen (gas pressure: 1 bar) and methanol permeability (32 g of methanol in 1000 g of H$_2$O) were measured as a function of temperature at S. Pauly/A. Becker in Wiesbaden with the aid of the membrane cell.

A commercially available perfluorinated polymer membrane having an IEC of 0.9 meq/g and a membrane swelling (80° C. in water) of swe=31% by weight is employed for comparison.

The mechanical properties of the comparative membrane are shown in the table below:

| | |
|---|---|
| Elastic modulus (N/mm$^2$); in humid air; 23° C. | 300 N/mm$^2$ |
| Elastic modulus (N/mm$^2$); in water; 80° C. | 50 N/mm$^2$ |
| Elongation at break (%) in humid air; 23° C. | 175% |
| Elongation at break (%) in water; 80° C. | 255% |

The permeability of the comparative membrane is as follows:

| Temperature (° C.) | Methanol/H$_2$O (g/m$^2$ · d) (32 g/1000 g H$_2$O) | O$_2$ permeability [cm$^3$ 50 μm/ (m$^2$ d bar)] | H$_2$ permeability [cm$^3$ 50 μm/ (m$^2$ d bar)] |
|---|---|---|---|
| 40 | 61.9 | 2350 | 9880 |
| 60 | 151 | 5250 | 18800 |
| 80 | 333 | 8590 | 36300 |
| 100 | 674 | 14300 | 65200 |
| 120 | 1266 | 23300 | 113100 |

EXAMPLES 1 AND 2

Polymer Blend Membranes Comprising Sulfonated PEEK (SPEEK) and Aminated PES(NH$_2$-PES)

The SPEEK has an ion exchange capacity of 1.73 meq/g. The NH$_2$-PES has a degree of substitution of 45% (1.9 meq/g). The polymer blend membrane TE-4 comprises 90% by weight of SPEEK and 10% by weight of NH$_2$-PES, and TE-5 comprises 85% by weight of SPEEK and 15% by weight of NH$_2$-PES.

The characterization data for the membranes are shown below:

Calculated IEC: TE-4: IEC=1.56 meq/g; TE-5:IEC=1.47 meq/g.

Membrane swelling (80° C.; 48 h): TE-4: swe=182.7% by weight; TE-5: swe=83.8% by weight

| | Conductivity | |
|---|---|---|
| T (° C.) | TE-4 (mS/cm) | TE-5 (mS/cm) |
| 23 | 64.6 | 28.9 |
| 30 | 73.6 | 34.4 |
| 40 | 85.5 | 40.8 |
| 50 | 97.3 | 47.6 |
| 60 | 108.9 | 53.8 |
| 70 | 120.3 | 59.2 |
| 80 | 131.4 | 63.6 |

| Mechanical properties | TE-4 | TE-5 |
|---|---|---|
| Elastic modulus (N/mm$^2$); in humid air; 23° C. | 1717.3 | 1212.5 |
| Elastic modulus (N/mm$^2$); in water; 80° C. | 348.6 | 492.9 |
| Elongation at break (%) in humid air; 23° C. | 20.4 | 39.5 |
| Elongation at break (%) in water; 80° C. | 275.3 | 268.8 |

The permeability of the membrane TE-5 is 2.35 [g.50 μm/(m$^2$.d)] at 40° C.

Figure 1:
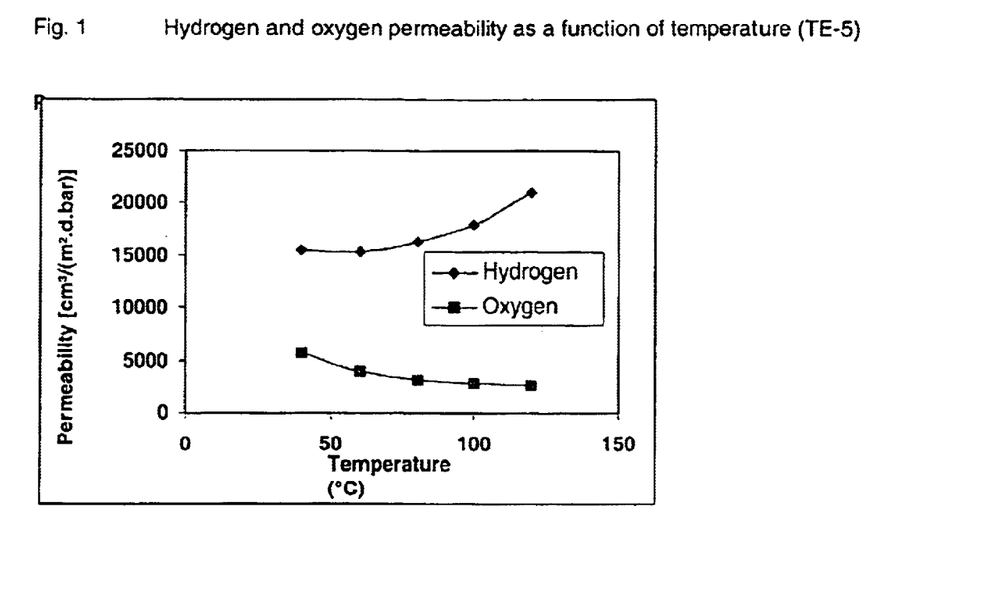
FIG. 1 is a graph of hydrogen and oxygen permeability as a function of temperature.
Figure 2:
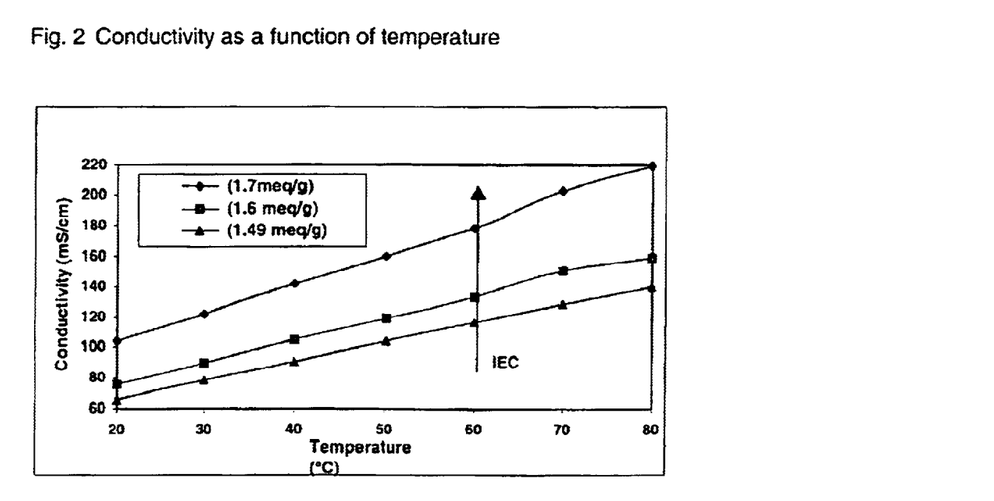
FIG. 2 is a graph of conductivity as a function of temperature.

The hydrogen permeability and oxygen permeability as a function of temperature (TE-5) are shown in FIG. 1:

EXAMPLES 3 AND 4

Polymer Blend Membranes Comprising Sulfonated PEEKK (SPEEKK) and Aminated PES(NH$_2$-PES)

The SPEEKK has an ion exchange capacity of 1.65 meq/g. The NH$_2$-PES has a degree of substitution of 45% (1.9 meq/g). The polymer blend membrane TE-8 comprises 90% by weight of SPEEKK and 10% by weight of NH$_2$-PES, and TE-9 comprises 85% by weight of SPEEKK and 15% by weight of NH$_2$-PES.

The characterization data of the membranes are shown below.

Calculated IEC: TE-8: IEC=1.49 meq/g; TE-9:IEC=1.40 meq/g.

Membrane swelling (80° C.; 48 h): TE-8: swe=137.4% by weight; TE-9: swe=95.2% by weight.

| | Conductivity | |
|---|---|---|
| T (° C.) | TE-8 (mS/cm) | TE-9 (mS/cm) |
| 23 | 45.4 | 28.0 |
| 30 | 54.7 | 34.0 |

-continued

| 40 | 64.0 | 40.1 |
| 50 | 73.4 | 46.3 |
| 60 | 82.6 | 52.3 |
| 70 | 91.6 | 58.4 |
| 80 | 99.5 | 63.8 |

| Mechanical properties | TE-8 | TE-9 |
| --- | --- | --- |
| Elastic modulus (N/mm$^2$); in humid air; 23° C. | 907.8 | 1181.4 |
| Elastic modulus (N/mm$^2$); in water, 80° C. | 442.3 | 486.0 |
| Elongation at break (%) in humid air; 23° C. | 11.6 | 17.6 |
| Elongation at break (%) in water, 80° C. | 230.2 | 190.1 |

The methanol permeability of the membrane TE-8 is 4.11 [g.50 $\mu$m/(m$^2$.d)] at 40° C.

EXAMPLES 5 TO 7

Polymer Blend Membranes Comprising Sulfonated PEK (SPEK) and Nitrated PES (NO$_2$-PES)

The SPEK has an ion exchange capacity of 2.13 meq/g. The NO$_2$-PES has a degree of substitution of 50% (1.97 meq/g). The polymer blend membrane TE-23 comprises 80% by weight of SPEK and 20% by weight of NO$_2$-PES, TE-24 comprises 75% by weight of SPEK and 25% by weight of NO$_2$-PES, TE-25 comprises 70% by weight of SPEK and 30% by weight of NO$_2$-PES.

The characterization data of the membranes are shown below.

Calculated IEC: TE-23: IEC=1.70 meq/g; TE-24: IEC=1.60 meq/g, TE-25: IEC=1.49 meq/g.

Membrane swelling (80° C. in water): TE-23: swe=99% by weight; TE-24: swe=68% by weight, TE-25: swe=47% by weight.

| Mechanical properties of TE-25 | |
| --- | --- |
| Elastic modulus (N/mm$^2$); in humid air; 23° C. | 2319.1 N/mm$^2$ |
| Elastic modulus (N/mm$^2$); in water; 80° C. | 402 N/mm$^2$ |
| Elongation at break (%) in humid air; 23° C. | 24.2% |
| Elongation at break (%) in water; 80° C. | 219.3% |

EXAMPLES 8 TO 10

Polymer Blend Membranes Comprising Sulfonated PEK (SPEK) and Aminated PES (NH$_2$-PES)

The SPEK has an ion exchange capacity of 2.13 meq/g. The NH$_2$-PES has a degree of substitution of 45% (1.9 meq/g). The polymer blend membrane TE-1 comprises 85% by weight of SPEK and 15% by weight of NH$_2$-PES, TE-2 comprises 80% by weight of SPEK and 20% by weight of NH$_2$-PES, TE-3 comprises 75% by weight of SPEK and 25% by weight of NH$_2$-PES.

The characterization data of the membranes are shown below.

Calculated IEC: TE-1: IEC=1.82 meq/g; TE-2: IEC=1.71 meq/g, TE-3: IEC=1.61 meq/g.

Membrane swelling (80° C. in water): TE-1: swe=167.2% by weight; TE-2: swe=122% by weight, TE-3: swe=70.4% by weight.

| | Conductivity | | |
| --- | --- | --- | --- |
| T (° C.) | TE-1 (mS/cm) | TE-2 (mS/cm) | TE-3 (mS/cm) |
| 23 | 115.8 | 91.4 | 68.6 |
| 30 | 135.8 | 107.5 | 81.4 |
| 40 | 155.5 | 123.6 | 94.4 |
| 50 | 174.8 | 139.3 | 107.1 |
| 60 | 193.2 | 154.3 | 119.4 |
| 70 | 210.9 | 168.9 | 131.4 |
| 80 | 227.9 | 182.3 | 141.9 |

| Mechanical properties | TE-1 | TE-2 | TE-3 |
| --- | --- | --- | --- |
| Elastic modulus (N/mm$^2$); in humid air; 23° C. | 2020.8 | 2420.6 | 2455.7 |
| Elastic modulus (N/mm$^2$); in water, 80° C. | 52.7 | 134.3 | 357.9 |
| Elongation at break (%) in humid air; 23° C. | 30.8 | 23.4 | 10.3 |
| Elongation at break (%) in water, 80° C. | 290.6 | 301.8 | 249.1 |

EXAMPLE 11

Three-Component Polymer Blend Membrane Comprising 75% by Weight of SPEK (IEC=2.13 meq/g), 25% by Weight of NO$_2$-PES (IEC=1.96 meq/g) and 0.5% by Weight of PVDF (TE-29)

The characterization data of the membranes are shown below.

Measured IEC (acid-based titration): TE-29: IEC=1.40 meq/g.

Membrane swelling (100° C., 72 h in water): TE-29: swe=162% by weight

Conductivity: 23° C.: 83.3 mS/cm; 30° C.: 99.0 mS/cm; 40° C.: 114.6 mS/cm; 50° C.: 0.1 mS/cm; 60° C.: 145.0 mS/cm; 70° C.: 159.4 mS/cm; 80° C.: 172.4 mS/cm.

| Mechanical properties | TE-29 |
| --- | --- |
| Elastic modulus (N/mm$^2$); in humid air; 23° C. | 2051.9 |
| Elastic modulus (N/mm$^2$); in water, 80° C. | 188.7 |
| Elastic modulus (N/mm$^2$); in water, 100° C., 72 h | 52.9 |
| Elongation at break (%) in humid air; 23° C. | 57.3 |
| Elongation at break (%) in water, 80° C. | 260.4 |
| Elongation at break (%) in water, 100° C., 72 h | 112 |

EXAMPLES 12 TO 19

Three-Component Polymer Blend Membranes Comprising SPEK, $NH_2$-PES (IEC=1.9 meq/g) and PVDF.

| Membrane No. | Materials & mixing ratio | IEC* (meq/g) | swe** (% by wt.) | swe*** (% by wt.) | cond. 80° C. (mS/cm) | cond. 90° C. (mS/cm) |
|---|---|---|---|---|---|---|
| TE-28 | SPEK (2.13 meq/g): 75%<br>$NH_2$-PES (1.9 meq/g): 25%<br>PVDF: 0.5% | 1.49 | — | 185 | 82.8 | — |
| TE-31 | SPEK (2.13 meq/g): 75%<br>$NH_2$-PES (1.9 meq/g): 25%<br>PVDF: 1% | 1.45 | 59 | 182 | 78 | — |
| TE-40 | SPEK (2.13 meq/g): 70%<br>$NH_2$-PES (1.9 meq/g): 30%<br>PVDF: 1% | 1.41 | 33.7 | 135.4 | — | — |
| TE-41 | SPEK (2.13 meq/g): 70%<br>$NH_2$-PES (1.9 meq/g): 30%<br>PVDF: 1.5% | 1.42 | 27.7 | 128 | 53.6 | 74.7 |
| TE-42 | SPEK (1.83 meq/g): 75%<br>$NH_2$-PES (1.9 meq/g): 25%<br>PVDF: 1% | 1.29 | 14 | 91 | 27.2 | 37.9 |
| TE-43 | SPEK (1.90 meq/g): 75%<br>$NH_2$-PES (1.9 meq/g): 25%<br>PVDF: 1% | 1.44 | 16 | 69 | — | — |
| TE-58 | SPEK (1.90 meq/g): 70%<br>$NH_2$-PES (1.9 meq/g): 30%<br>PVDF: 1% | 1.25 | 25.7 | 101.7 | 56 | — |
| TE-45 | SPEK (1.64 meq/g): 80%<br>$NH_2$-PES (1.9 meq/g): 20%<br>PVDF: 0.5% | 1.36 | 12 | 68 | — | — |
| TE-70 | SPEK (2.17 meq/g): 80%<br>$NH_2$-PES (3.8 meq/g): 20%<br>PVDF: 1% | 1.64 | — | 204.7 | 80 | |

*Potentiometric titration with 0.1 N NaOH.
**The sample was heated in water at 80° C. for 72 h.
***The sample was heated in water at 100° C. for 72 h.

Mechanical Properties:

TE-28 (23° C.; 50% humidity): Elastic modulus: 2689.7 $N/mm^2$; Elongation at break: 23.7%.

The mechanical properties of the membranes in water at 80° C. are shown in the table below.

| | Mechanical properties of the membranes (80° C. in water) | | | | | | | |
|---|---|---|---|---|---|---|---|---|
| | TE-28 | TE-31 | TE-40 | TE-41 | TE-42 | TE-43 | TE-58 | TE-45 |
| Elastic modulus ($N/mm^2$) | 420.4 | 428.8 | 502.3 | 480.9 | 806.6 | 824.6 | 701 | 995.6 |
| Elongation at break (%) | 246.6 | 278.3 | 202.5 | 127.5 | 83 | 16.6 | 28.2 | 177.9 |

| Mechanical properties of the membranes (100° C.; 72 h in water)* | | |
|---|---|---|
| | TE-58 | TE-70 |
| Elastic modulus ($N/mm^2$) | 195.6 | 269.1 |
| Elongation at break (%) | 128.3 | 231.7 |

The membranes were heated in water at 100° C. for 72 h.

Dynamic Mechanical Analysis:

Dynamic mechanical analysis describes the stiffness and damping behavior of a test specimen quantitatively by means of the storage modulus E', the loss modulus E" and the loss factor tan δ as a function of temperature, time and frequency.

The measuring instrument is a dynamic mechanical analyzer DMA 242 (Netzsch-Gerätebau GmbH).

The test conditions are as follows:

Measurement mode: tensile
Target amplitude: 30 μm (auto.)
Static force: Prop.: 1.2
Dynamic force: 0.5N
Frequency: 1 Hz
Temperature range: −50° C. to 300° C.
Heating rate: 5K/min
Specimen width: 4 mm During the measurement, the films shrink with increasing temperature. A further increase in the temperature results in elongation of the specimen. Above 200° C., the modulus decreases sharply. The specimen elongates tremendously and the tan δ curve goes through a maximum. The maximum indicates a glass transition temperature of 254° C. for TE-31 and TE-28. The results are shown in the table.

Storage modulus values (E') as a function of temperature

| Membrane No. | E'(MPa); −30° C. | E'(MPa); 0° C. | E'(MPa); RT | E'(MPa); 100° C. |
|---|---|---|---|---|
| TE-31 | 2500 | 1800 | 1700 | 1900 |
| TE-28 | 2700 | 2300 | 1500 | 2400 |
| Nafion-115* | 1400 | 370 | 430 | 60 |

*Comparative example;

The membranes TE-31 and sulfonated, perfluorinated polymer, for example Nafion-115, display high damping behavior.

Thermal Properties

The glass transition temperature was determined by means of DSC, and the decomposition temperature was determined by means of TGA.

| Material | DSC | TGA |
|---|---|---|
| PVDF | Tm=148.5° C. | Above 400° C. |
| NH$_2$-PES | Tg=238.6° C. | Above 320° C. |
| SPEK | Tg=181.7° C. | Above 300° C. |
| Blend membrane | Tg$_1$=167.5° C.; Tg$_2$=227.3° C. | Above 300° C. |

Permeability of TE-42

| Temperature (° C.) | Methanol/H$_2$O (g/m$^2$ · d) (32 g/1000 g H$_2$O) | O$_2$ permeability [cm$^3$ 50 μm/ (m$^2$ d bar)] | H$_2$ permeability [cm$^3$ 50 μm/ (m$^2$ d bar)] |
|---|---|---|---|
| 40 | 2.5 | 293 | 3770 |
| 60 | 6.8 | 351 | 5380 |
| 80 | 16.1 | 417 | 7410 |
| 100 | 36 | 547 | 10250 |
| 120 | 67 | 763 | 14130 |

Testing of the Membranes in a Direct Methanol Fuel Cell (DMFC)

Membrane TE-31:

Operating temperature: T=100° C.;
Platinum content of the electrodes: anode: 0.16 mg/cm$^2$; cathode: 0.62 mg/cm$^2$;
Fuel cell: 1.0 M methanol; methanol/air;
Current-voltage ratio: 150 mA/cm$^2$ at 430 mV; 200 mA/cm$^2$ at 375 mV, 300 mA/cm$^2$ at 250 mV.

The membrane displayed very severe swelling in DMFC.

Membrane TE-41:

Operating temperature: T=110° C.;
Platinum content of the electrodes: anode: 0.16 mg/cm$^2$; cathode: 0.62 mg/cm$^2$;
Fuel cell: 0.4 M methanol; methanol/air: 3/3 bar;
Current/voltage ratio: 200 mA/cm$^2$ at 468 mV, 300 mA/cm$^2$ at 308 mV.

Membrane TE-42:

Operating temperature: T=110° C.;
Platinum content of the electrodes: anode: 0.16 mg/cm$^2$; cathode: 0.62 mg/cm$^2$;
Fuel cell: 0.4 M methanol; methanol/air: 3/3 bar;
Current/voltage ratio: 200 mA/cm$^2$ at 463 mV, 300 mA/cm$^2$ at 300 mV.

In a fuel cell, hydrogen is introduced into the anode cells and oxygen is introduced into the cathode cells. Reduction of the membrane material by means of hydrogen can take place under the catalytic action of platinum. Conversely, oxidation of the membrane material by means of oxygen can likewise take place in the presence of platinum. To increase the chemical stability of the membrane in fuel cells, polymer blend membranes having a multilayer structure have been developed.

Such a membrane having a double layer consists of a total of four components. One of the double layers comprises sulfonated PEK, aminated PES and PVDF, while the other comprises sulfonated PEK, nitrated PES and PVDF.

The PES-NO$_2$ component is very stable to oxidation by oxygen, and PES-NH$_2$ is very stable to reduction by hydrogen or methanol. This improves the chemical stability.

The multilayer membrane is produced by the following steps:

A membrane layer is firstly produced by the method described in section 1.

A thin film is applied to this layer from a polymer solution. The solvent is evaporated.

The double layer produced is conditioned.

EXAMPLE 20

Figure 3:
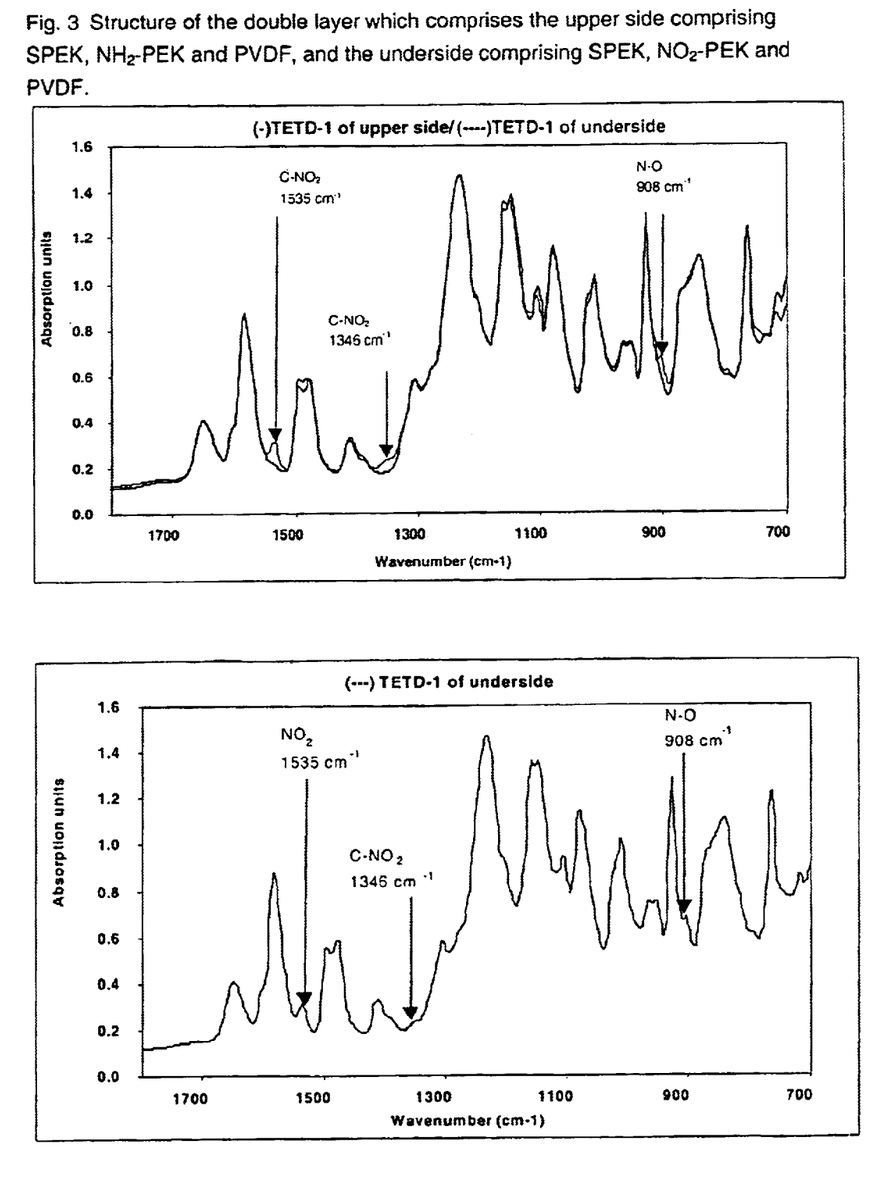
FIG. 3 shows spectras for a double layer membrane.

The structure of the double layer (TETD-1) is:

Composition:

Upper side: SPEK (2.13 meq/g): 76.5% by weight; NH$_2$-PES (1.9 meq/g): 22.5% by weight; PVDF: 1% by weight
Underside: SPEK (2.13 meq/g): 75% by weight; NO$_2$-PES (1.97 meq/g): 24% by weight; PVDF: 1% by weight Membrane Structure FIG. 3 shows the spectra of the double-layer membrane. It can be seen from the figure that the absorption bands of the underside at 1535 cm$^{-1}$, 1346 cm$^{-1}$ and 908 cm$^{-1}$ are assigned to the vibrations of NO$_2$-PES.

Conductivity of TETD-1

| | T (° C.) | | | | | |
|---|---|---|---|---|---|---|
| | 80 | 70 | 60 | 50 | 40 | 30 | 20 |
| Upper side (mS/cm) | 128.4 | 118.5 | 107.4 | 96.1 | 84.5 | 72.3 | 61.1 |
| Underside (mS/cm) | 128.6 | 119.0 | 108.0 | 96.9 | 85.0 | 73.2 | 61.5 |

| Mechanical properties of TETD-1 | TETD-1 |
|---|---|
| Elastic modulus (N/mm$^2$); in humid air; 23° C. | 2222.1 |
| Elastic modulus (N/mm$^2$); in water, 80° C. | 217.0 |
| Elongation at break (%) in humid air; 23° C. | 51.1 |
| Elongation at break (%) in water, 80° C. | 291.2 |

I claim:

1. A membrane comprising:
   A) at least one functional polymer based on one or more aryl polymers bearing sulfonic acid groups,
   B) at least one reinforcing polymer which is based on one or more aminated polyether sulfones/polyether ether sulfones or nitrated polyether sulfones/polyether ether sulfones and, as a result of its interaction with the functional polymer, improves the stability of the membrane in respect of the swelling behavior and
   C) at least one plasticizer which reduces the brittleness of the above-mentioned polymers.

2. The membrane according to claim 1, wherein said functional polymer further comprises the sulfonated aryl polymer comprising aromatic building blocks selected from the group consisting of:

and thermally stable linking units selected from the group consisting of:

3. The membrane according to claim 2, wherein said sulfonated aryl polymer being selected from the group consisting of sulfonated polyether ether ketone, sulfonated polyether ketone, sulfonated polyether ether ketone ketone, sulfonated polyether sulfone and sulfonated polyether ether sulfone or PBI.

4. The membrane according to claim 3, wherein the sulfonated aryl polymer has a degree of sulfonation of from 0.1 to 100%.

5. The membrane according to claim 1, wherein the sulfonated aryl polymer being employed in amounts of from 30 to 99.9% by weight, based on the total polymer.

6. The membrane according to claim 1, wherein said reinforcing polymer further comprises one or more aminated polyether sulfones and polyether ether sulfones comprising the structural units:

where x are each, independently of one another, 0, 1, 2, 3 or 4.

7. The membrane claim 1, wherein said reinforcing polymer further comprises one or more nitrated polyether sulfones and polyether ether sulfones comprising the structural units:

where x are each, independently of one another, 0, 1, 2, 3 or 4.

8. The membrane according to claim 6, wherein said reinforcing polymer further comprises an aminated polyether sulfone or an aminated polyether ether sulfone comprising the structural units of the types:

9. The membrane according to claim 7, wherein said reinforcing polymer further comprises a nitrated polyether sulfone or a nitrated polyether ether sulfone comprising the structural units of the types 10. The membrane according to claim 1, wherein the reinforcing polymer being employed in amounts of from 0.1 to 70% by weight, based on the total polymer.

11. The membrane according to claim 1, wherein the plasticizer reduces the brittleness of the membrane produced from the polymer blend.

12. The membrane according to claim 11, wherein the plasticizer is inert under the conditions prevailing in a fuel cell.

13. The membrane according to claim 12, wherein the plasticizer is miscible and compatible with the functional and reinforcing polymers.

14. The membrane according to claim 13, wherein the plasticizer is soluble in dimethylformamide (DMF), dimethyl sulfoxide (DMSO), N-methylpyrrolidone (NMP) or N,N-dimethylacetamide (DMAC).

15. The membrane according to claim 14, wherein a linear polyvinylidene fluoride (PVDF) is used as plasticizer.

16. The membrane according to claim 1, wherein the plasticizer content is up to 5% by weight, based on the total polymer.

17. The membrane according to claim 1 which consists of a plurality of identical or different layers (multilayer).

18. The membrane according to claim 17 further comprises at least two different layers selected from the group consisting of sulfonated polyether ketone and aminated polyether sulfone, sulfonated polyether ketone and nitrated polyether sulfone, sulfonated polyether ketone and aminated polyether sulfone and plasticizer, sulfonated polyether ketone and nitrated polyether sulfone and plasticizer.

19. A membrane electrode units (MEA) for fuel cells, in particular for low-temperature fuel cells at an operating temperature of from 10° C. to 200° C. comprising a polymer electrolyte membrane as claimed in any one or more of claims 1–18.

20. A fuel cell comprising a polymer electrolyte membrane as claimed in one or more of claims 1 to 18.

* * * * *